United States Patent [19]

Cawley

[11] Patent Number: 4,511,114
[45] Date of Patent: Apr. 16, 1985

[54] CENTRALLY ACTIVATED PIPE SNUBBING SYSTEM

[75] Inventor: William E. Cawley, Richland, Wash.

[73] Assignee: The United States of America as represented by the United States Department of Energy, Washington, D.C.

[21] Appl. No.: 340,450

[22] Filed: Jan. 18, 1982

[51] Int. Cl.$^3$ ............................................. F16M 13/00
[52] U.S. Cl. ...................... 248/550; 248/49; 188/1.11; 188/67; 188/163
[58] Field of Search .............. 188/1.11, 67, 378, 381, 188/163, 134; 248/49, 550, 58, 59; 92/5 R; 52/1, 167

[56] References Cited

U.S. PATENT DOCUMENTS

| | | | |
|---|---|---|---|
| 508,851 | 11/1893 | Skinner | 188/163 |
| 1,112,031 | 9/1914 | Ream | 188/67 |
| 1,452,528 | 4/1923 | Rohlfing | 188/163 X |
| 1,928,750 | 10/1933 | Apple et al. | 188/163 X |
| 2,574,309 | 11/1951 | Wood | 188/67 X |
| 2,851,126 | 9/1958 | Ward, Jr. | 188/67 X |
| 2,964,272 | 12/1960 | Olson | 248/550 |
| 2,965,343 | 12/1960 | Sherburne et al. | 248/550 X |
| 3,059,915 | 10/1962 | Kemelhor | 188/1.11 X |
| 3,115,886 | 12/1963 | Loepsinger | 248/58 |
| 3,203,513 | 8/1965 | Allen | 188/67 X |
| 3,327,814 | 6/1967 | Nickell | 188/129 |
| 3,783,976 | 1/1974 | Kerr | 188/67 X |
| 4,140,045 | 2/1979 | Hardwick et al. | 92/5 R |
| 4,265,467 | 5/1981 | Aleck | 188/381 X |
| 4,347,423 | 8/1982 | Katsube et al. | 188/67 X |

FOREIGN PATENT DOCUMENTS 2059592 6/1971 Fed. Rep. of Germany ....... 92/5 R
2348066 3/1975 Fed. Rep. of Germany ....... 92/5 R

OTHER PUBLICATIONS

*Life of Plant Seal Design Pipe Support Snubbers*, Pub. No. PMH-ND-1505 778-10-PL, Paul-Munroe Hydraulics, Inc., pp. 1-8.

*Aerospace Technology Applied to Nuclear Power Plant Problems*, James E. Glauser, Pacific Scientific, Bulletin PSA-3, pp. 1-5.

*Primary Examiner*—George E. A. Halvosa
*Attorney, Agent, or Firm*—Edward W. Nypaver; Robert Southworth, III; Judson R. Hightower

[57] ABSTRACT

An electromechanical pipe snubbing system and an electromechanical pipe snubber. In the system, each pipe snubber, in a set of pipe snubbers, has an electromechanical mechanism to lock and unlock the snubber. A sensor, such as a seismometer, measures a quantity related to making a snubber locking or unlocking decision. A control device makes an electrical connection between a power supply and each snubber's electromechanical mechanism to simultaneously lock each snubber when the sensor measurement indicates a snubber locking condition. The control device breaks the connection to simultaneously unlock each snubber when the sensor measurement indicates a snubber unlocking condition. In the snubber, one end of the shaft slides within a bore in one end of a housing. The other end of the shaft is rotatably attached to a pipe; the other end of the housing is rotatively attached to a wall. The snubber's electromechanical mechanism locks the slidable end of the shaft to the housing and unlocks that end from the housing. The electromechanical mechanism permits remote testing and lockup status indication for each snubber.

11 Claims, 5 Drawing Figures

CENTRALLY ACTIVATED PIPE SNUBBING SYSTEM

The United States Government has license rights in this invention.

BACKGROUND OF THE INVENTION

The present invention relates generally to pipe snubbers and more particularly to a pipe snubbing system for simultaneously locking or unlocking a set of pipe snubbers based on the output of one or more strategically positioned sensors.

The function of pipe snubbers is to provide lateral restraint for process piping during a seismic or other abnormal vibration event, while permitting normal pipe displacements at other times, such as normal vibrations, expansion and contraction, and other acceptable pipe motion. To perform this function, the snubber "locks up" (i.e., effectively becomes a rigid strut, tying the process pipe to the facility wall). The purpose for providing lateral restraint for the pipe during a seismic event is to minimize the possibility of pipe "whip" (large amplitude pipe swaying or vibration) which in turn would result in high pipe stresses, possibly leading to failure of the pipe with inherent serious consequences to the facility. Ideally, the snubbers would not, at all other times, apply any side load to the pipe.

Snubbers are used to protect process piping for any applications where pipe failure, as a result of a seismic event, would have serious safety or other consequences. Applications at the U.S. Department of Energy's Hanford facility include the primary and secondary coolant system piping of the FFTF (Fast Flux Test Facility) and the N Reactor. The FFTF uses about 3,300 mechanical snubbers while the N Reactor employs about 1,000 hydraulic snubbers. Snubbers are used extensively in chemical plants, pipeline pumping stations and in fossil and solar power plants, as well as in nuclear power plants. The same snubbers may be utilized in nuclear and non-nuclear applications as long as the lubricants and materials used in constructing the snubbers are not significantly effected by radiation.

Existing snubbers include the hydraulic type and the mechanical type. One existing hydraulic snubber uses a control valve, with no moving parts, which is built into the piston. The valve allows fluid flow through the piston and hence piston rod movement under normal conditions (i.e., when the pipe is moving slowly relative to the building, as a result of temperature changes), but will react to block fluid flow and hence piston rod movement under strong pipe force conditions (i.e., large and/or rapid pipe displacements). One existing mechanical snubber has a lead screw/ball nut arrangement rotating a flywheel. Only strong pipe forces (i.e., rapid, large pipe displacements) will rotate the flywheel fast enough so that a centrifugal-force-responsive brake is actuated to lock the ball nut with respect to the lead screw. About half of the commercial power producing reactors in this country use hydraulic snubbers; the other half use mechanical snubbers. In all cases, the snubbers employed are isolated units: each must individually sense the increase in g loading (sensing either pipe displacement or acceleration) resulting from a seismic event on the associated process pipe, and each must react by "locking up" at a predetermined g loading, unlock when the g loading is reversed, and again "lock up" to limit displacement in the opposite direction. This cycle is repeated until the amplitude of the pipe displacement or acceleration is reduced below the level at which the device is triggered to "lock up".

A review of the current thinking regarding alternate snubber design concepts indicates that the effort is on finding other, hopefully more reliable, mechanical devices, for restraining rapid pipe motion. For example, in New Zealand, an effort is being made to adapt clamped flat plates sliding relative to each other to perform this function. In this country, a concept utilizing a hoop interposed between the pipe and the facility wall has been proposed to allow slow displacments of the process pipe while restraining large, rapid transient motions.

As noted above, the state-of-the-art snubbers depend upon each individual snubber sensing the relatively rapid motion of the attached pipe which occurs during a seismic event. Thus each snubber acts as an individual unit. During a seismic event, each will be activated at g loadings (accelerations and velocities) which depend upon the individual snubber's set point as determined by its original manufacture and modified by its current status regarding wear and maintenance. Thus, at any time during a seismic event, some of the snubbers will be "locked-up" (actuated). Others will still allow free motion of the pipe. Note also that each type of state-of-the-art snubbers, by its design, applies a continual side load of undetermined magnitude on the adjacent pipe. There is no functional benefit resulting from this drag. It is, however, inherent in all state-of-the-art snubbers.

Hydraulic snubbers generally fail as the result of seal leakage. This is usually first evidenced by hydraulic fluid on the floor below the snubber. This external leakage is thus easily noted. Each snubber has a small reservoir, and the operability of the individual snubber requires that the cylinder and tubing be full of hydraulic fluid (and devoid of air). Thus, the length of time a snubber is serviceable, as far as external leakage is concerned, depends on the external leak rate and quantity of reserve fluid. When the reservoir empties, air can enter the snubber's cylinder, tubing and valve arrangements. When this occurs, the snubber will no longer restrict the pipe motion as required. That is, it will not "snub". Thus, because of leaking external seals, the hydraulic snubbers currently in use require considerable personnel radiation exposure and reactor shutdown time for maintentance.

Another problem is related to the fact that even if the external seals do not leak, there is no way to determine, in situ, if each of the snubbers will perform its function when required or if it is presently and undesirably "locked up".

Mechanical snubbers depend upon inertia to operate a brake to cause the snubber to "lock up". During normal heat up and cool down of the process piping, the rate of motion is relatively small. The snubber applies a small side force on the pipe. This force slowly rotates the flywheel. When a seismic event occurs, the flywheel rotational velocity increases to the point at which centrifugal force causes the brake to actuate, momentarily stopping the flywheel and thus the longitudinal motion. Upon reversal of direction of the pipe motion, the brake on the flywheel releases, the flywheel begins rotating rapidly in the opposite direction, and the centrifugal brake again operates. It is obvious that wear, maintenance work, repeated tests, and adjustments will have an effect on reliability and upon the set point at which "lock up" occurs. To determine the condition of the individual snubbers, i.e., whether each is "locked up" or is free and ready to perform its function, it is necessary to remove it from its mountings and take it to a shop or return it to the manufacturer for test and recertification of its "lock-up" setting. Thus, inspection, test, and maintenance over the life of the facility will be costly in terms of maintenance craft hours, personnel radiation exposure, and outage time required to disassemble the snubbers from their installed positions and to check out and maintain the individual snubbers. Repair of snubbers will be expensive since "clean room" repair conditions are recommended by the manufacturer. Degradation of lubrication contributes further to maintenance costs and to changes in the set point at which "lock up" occurs.

Since the mechanical snubbers available commercially utilize a ball nut-lead screw and flywheel, significant normal vibration of the pipe can cause excessive wear of the "continually" reciprocating parts. At particular amplitudes of vibration and at particular frequencies, excessive wear and premature "lock up" can occur. It should be noted that premature "lock up" can cause excessive pipe stresses by restraining the motion of the pipe during thermal transients.

SUMMARY OF THE INVENTION

It is an object of the invention to provide a pipe snubbing system which will simultaneously lock-up all snubbers in unison during a seismic or other abnormal vibration event to minimize stresses that may otherwise occur from oscillations in "unsnubbed" sections of pipe.

It is another object of the invention to provide a reliable pipe snubber which can be electromechanically locked and unlocked based upon the output of a strategically placed sensor.

It is an added object of the invention to provide a pipe snubber which essentially applies no side load to the pipe when the snubber is unlocked.

It is also an object of the invention to provide a pipe snubber whose locked/unlocked status can be quickly and remotely determined without personnel radiation exposure or plant shutdown.

It is a further object of this invention to provide a pipe snubber whose locking and unlocking operation can be quickly and remotely tested without personnel radiation exposure or plant shutdown.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

In one aspect thereof, the pipe support of the present invention is characterized by a plurality of snubbers for supporting a pipe system, each of the snubbers including means for locking the snubber in a position restraining pipe displacements and for unlocking the snubber in a position permitting normal pipe displacements. A sensor is provided for sensing an abnormal condition which could cause excessive pipe displacements. A control responsive to the sensor is operative to simultaneously lock all of the snubbers in unison to restrain the pipe system against pipe displacements. The controller mechanism will change back the electrical connection to unlock the snubbers when the sensor-measured quantity meets a defined unlocking criterion.

It is also preferred that the pipe snubbing system have a locked/unlocked status indicator mechanism and a locking/unlocking operation testing mechanism.

Preferably, an electromechanical device locks the snubbers upon application of electrical energy when the controller mechanism makes the electrical connection and unlocks the snubber when the controller mechanism breaks the connection.

It is also preferred that the sensor be a seismometer and that the controller mechanism react to earthquake initiation and termination criteria.

In another aspect of this invention, a snubber is provided and characterized by a housing attached to a first member and a shaft attached to a second member. The shaft is mounted within the housing for relative reciprocal movement thereto upon relative movement between said members. A gripping means connected to the housing is operative for engagement with the shaft to prevent relative movement between the housing and the shaft.

Several benefits and advantages are derived from the invention. All pipe snubbers installed in a particular system can be simultaneously locked-up during a seismic event, minimizing pipe stresses. Also, an electromechanical snubber locking and unlocking device applies no side load to the pipe when unlocked, and avoids the reliability problems of fluid loss in hydraulic type snubbers and the reliability problems of premature lock-up, random set point change, excessive wear, etc. in individual mechanical type snubbers. The invention can remotely and rapidly indicate each snubber's locked/unlocked status, and each snubber may be remotely and rapidly tested for proper locking/unlocking operation, all without plant shutdown or worker radiation exposure.

BRIEF DESCRIPTION OF THE DRAWINGS

The accompanying drawings which are incorporated in and form a part of this specification, illustrate several embodiments of the present invention and, together with a description, serve to explain the principles of the invention. In the drawings:

FIG. 4A is a cutaway side view.

DETAILED DESCRIPTION OF THE INVENTION

Reference will now be made in detail to the present preferred embodiments of the invention, examples of which are illustrated in the accompanying drawings.

Figure 1:
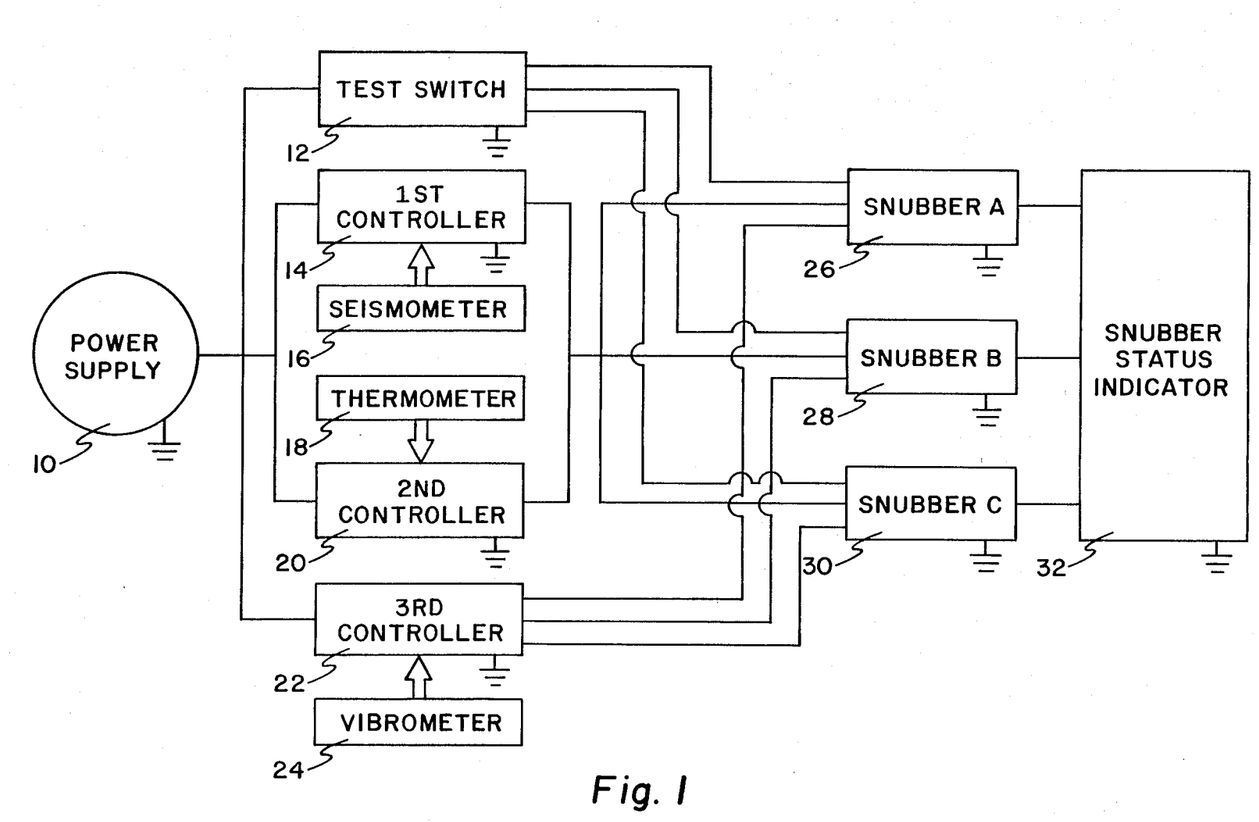
FIG. 1 is a block diagram of the augmented electromechanical pipe snubbing system.
Figure 2:
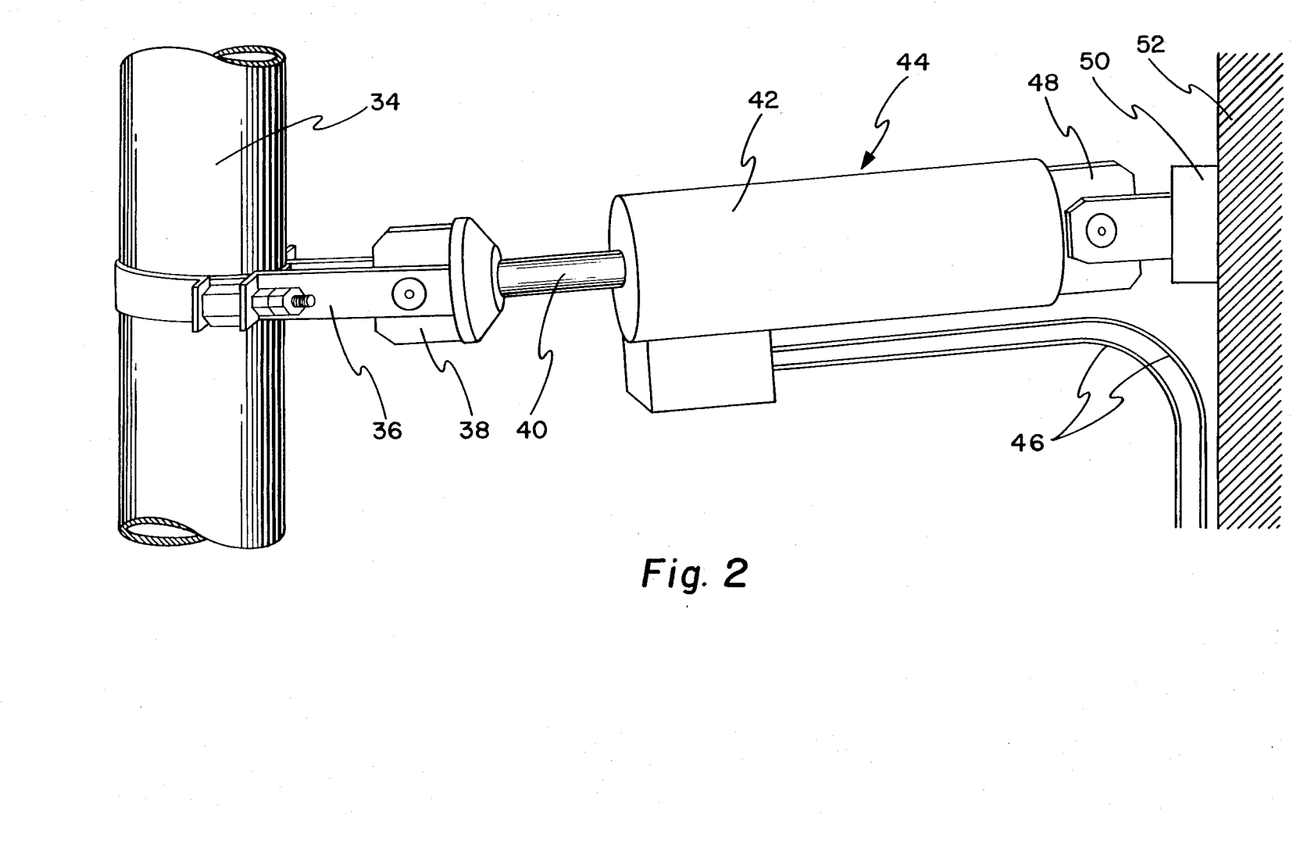
FIG. 2 is a perspective view of one of the electromechanical pipe snubbers of FIG. 1, showing how it is mounted to the pipe and the support (wall).

The basic pipe snubbing system is contained within the augmented system depicted in the block diagram of FIG. 1, with the installation of an electomechanical pipe snubber 44 shown in FIG. 2. The system requires a set or group of electromechanical pipe snubbers, with each pipe snubber having an electromechanical means for locking and unlocking. An example of a friction or brake shoe type of electromechanical locking and unlocking means is diagramed in FIG. 3, while a collet chuck type is illustrated in FIGS. 4A, 4B. In FIG. 1, the set of electromechanical pipe snubbers consists of snubber A 26, snubber B 28, and snubber C 30. In practice, the set may consist of several hundred or more snubbers protecting a multitude of process piping.

The system also includes a sensing means which measures a variable or quantity which is related to making a snubber locking and unlocking decision. Preferably, especially for nuclear reactors, the sensor will include a seismometer 16 which will measure the acceleration, velocity, and/or displacement of the earth's surface. Other sensors include thermometers and vibrometers, but they are usually used to supplement the basic system. Since the sensor will be used to simultaneously lock and unlock all the pipe snubbers in unison, it should be strategically positioned. In the case of a seismometer, the sensor would be placed to measure ground movement in the vicinity of the piping and could be located on the concrete slab which forms the bottom of the containment vessel. A simple seismometer could be one of the damped-pendulum type having an electrical contact ring set to give a signal for earth surface acceleration equal to or greater than a certain amount, such as 0.05 g (where g is the gravitational acceleration at the earth's surface). Preferably a more discerning seismometer is used which gives an electical signal output proportional to earth surface acceleration.

The system additionally has an electric power supply 10. In certain applications, the power company supplied plant electricity can be used successfully. However, a standby emergency electric power supply may be required where there is danger of an earthquake interupting power, and there is a likelihood of thermal pipe changes after an earthquake which would require the snubber to both lock and unlock in a relatively short time in order to protect the piping from possible failure due to stress. If no thermal pipe changes are expected, the piping could be protected by locking upon the opening of an electric circuit, instead of upon the closing of a circuit, and that opening of the circuit could be initiated by the seismometer, or by the earthquake itself disrupting the power company supplied electricity.

The basic pipe snubbing system finally requires a controlling means, such as the first controller 14 in FIG. 1, for switching a first electrical connection, by closing or opening a circuit, between the power supply 10 and all of the pipe snubbers' electomechanical locking and unlocking means to lock the set of pipe snubbers. The controlling means does this when the sensor, such as the seismometer, measures a variable, such as earth surface acceleration or displacement, which satisfies a predetermined snubber-locking condition, such as the start of an earthquake. The controlling means also switches back (by opening or closing the circuit) the electrical connection to unlock the set of pipe snubbers when the sensor (e.g., seismometer) measures a variable (e.g., ground movement) which satisfies a predefined snubbing-unlocking condition (e.g., earthquake termination).

Preferably, such controlling means includes a microprocessor, or other computer, and a relay. The output of the sensor, such as a seismometer, would be digitalized and fed into the microprocessor. The microprocessor would be preprogrammed wih a snubber locking criterion and a snubber unlocking criterion. For example, using a seismometer output, the snubber locking criterion could be the first measurement of the absolute value of earth surface acceleration which equals or exceeds a certain level, such as 0.05 g. When the microprocessor detects this condition, by matching the sensor's digitalized output against the pre-set level, it would initiate and continue to send a small electrical signal to trip a relay which would switch the electrical connection between the power supply and the snubbers to simultaneously lock them up in unison. The snubbers could be made to lock on the closing or opening of that connection. The snubber unlocking criterion could be when the absolute value of a certain number of consecutive maximum and minimum peaks of the acceleration first falls below a certain value, such as 0.02 g. Here the microprocessor would perform the simple mathematical operations and when the required number (e.g., five) of consecutive 0.02 g, or less, peaks is reached, it would stop sending the small electical signal to the relay which would release the relay to switch back the power supply/snubber set electrical connection. A typical system would have the snubber energizably lock and de-energizably unlock, with the controlling means closing the power supply/snubber set electrical circuit connection for locking, and opening that circuit connection for unlocking.

Other earthquake initiation and termination criteria could be chosen, as is appreciated by those skilled in the art. A minimum absolute value of ground velocity or displacement (vertical and/or lateral) may be chosen to define the start of an earthquake. An earthquake may be considered to have ended when the differences between a certain number of consecutive displacement measurements are less than a pre-selected value. Other control means, useful for the simple pendulum-contact ring seismometer, would include a timer and pulse counting circuit which would count the number of times the pendulum seismometer touched the contact ring over a predetermined time interval. This timer and pulse counting circuit would initiate and keep sending an output signal to a relay as long as one count or more were received during the interval. This output signal would trip the relay which would make the power supply/snubber set electrical connection to lock the snubbers. When no pulses were counted over the interval, the timer and pulse counting circuit would remove the output signal to the relay which would open the power supply/snubber set electrical connection to unlock the snubbers.

For certain applications, a thermometer or vibrometer may replace the seismometer, but usually the thermometer and/or vibrometer would supplement or augment the seismometer sensor. Within the piping of a facility, there may be one or more piping sections which are susceptible to temperature changes, usually from the fluid such piping sections contain. An example of such a pipe section would be the primary coolant piping of a nuclear power plant which would experience temperature changes with power level changes including reactor startup and shutdown. During such temperature transients, the piping section will expand or contract relatively slowly. Such pipe movements are normal and should be allowed to avoid excessive stresses on the pipes in that section. Thus, the subset of facility pipe snubbers associated with that piping section should allow unrestrained thermal pipe movement. An augmented system accomplishing this would operate on the philosophy of keeping the pipe snubber normally locked, and unlocking them to allow for thermally induced pipe movements unless an earthquake occurred during the thermal pipe movement. To the basic pipe snubber/seismometer system would be added thermometric means, such as the thermometer 18 of FIG. 1, for measuring the temperature change within the piping section. A second controller 20 would also be added which would make a second electrical connection between the power supply 10 and the subset of pipe snubbers associated with that piping section. The connection would be made when the thermometer measured a temperature change in the piping section which met a predefined pipe thermal movement termination condition such as when the pipe temperature did not change over a predetermined time. In FIG. 1, the piping section snubber subset consists of the entire set of snubbers. The second controller 20 would break the second electrical connection when the pipe section temperature change measurement satisfied a pre-selected pipe thermal movement initiation condition. The thermometric means would include any form of thermometer compatible with the pipe section environment, and the thermometer output would normally be an electrical voltage corresponding to temperature. Preferably, the second controller means would include the same microprocessor used in the basic seismometer system. Such a microprocessor could convert the thermometer's digitalized voltage into temperature and apply or remove an electrical signal to a second relay, as in the seismometer case, to make or break a power supply/snubber subset second electrical connection to lock or unlock the snubbers in the piping section. A pipe thermal movement initiation condition could be defined as a temperature change, after the snubbers were last locked up, equal to, or exceeding, a pre-selected value (such as 2 degrees Centigrade). Any measurement below that level would be treated as the pipe thermal movement termination condition. Other second controller means would include pulse counting, timer, and comparison circuits, known to those skilled in the art, which would be equivalent to the programming of the microprocessor.

Likewise, within the piping of a facility, there may be one or more piping segments which are susceptible to harmful local vibrations, such as from the startup of a coolant pump. During such local vibrations, the piping segment, through its associated subgroup of pipe snubbers, should be locked, while the rest of the facility's piping should be unlocked. To further augment the pipe snubber seismometer/thermometer system, vibrometric means (such as the vibrometer 24 of FIG. 1) would be added for measuring oscillation of the piping segment. A third controller means would also be added (such as the third controller 22 of FIG. 1) which would make a third electrical connection between the power supply and the subgroup of pipe snubbers associated with the piping segment when the measured oscillation met a predetermined pipe vibration initiation condition. Likewise, the third controlling means would break the power supply/pipe snubber subgroup third electrical connection when the oscillations satisfied a predefined pipe vibration termination condition. Vibrometers are a standard item and would include any accelerometer such as those used for aerospace inertial navigation systems.

In this fully augmented system, as depicted in FIG. 1, where the pipe snubber subset and subgroup consists of the entire set of snubbers (three shown), the system would operate as follows. The pipe snubbers (e.g., snubber A 26, snubber B 28, and snubber C 30) in the piping section would be normally locked as the second controller 20 would usually connect the power supply 10 to the snubbers since the thermometer 18 would usually show no temperature changes. During a temperature change, the second controller 20 would unlock the snubbers. However, if during the temperature change, local pipe vibrations were sensed by the vibrometer 24, the third controller 22 would lock the snubbers in that piping segment. Also, if during the temperature change an earthquake were detected by the seismometer 16, the first controller 14 would connect the power supply 10 to the snubbers to lock them up. It should be noted that the thermometer 18 and second controller 20 could be removed from the system for operation under the philosophy of having the snubbers normally unlocked.

The electromechanical pipe snubber 44, as used in the pipe snubbing system and as shown in FIG. 2, has a housing 42, a piston rod or shaft 40, and an electromechanical locking and unlocking means. Wire leads 46 extending from the housing 42 connect the electromechanical locking and unlocking means with the controlling means. The housing has one end 48 rotatably attached (as is typical of conventional snubbers) to a bracket 50 which is fixed to a support, such as the wall 52 of the facility. The other end of the housing has a bore. The shaft 40 has one end 38 rotatably attached (as in existing snubbers) to a clamp 36 which is fixed to a pipe 34. A single pipe could have several snubbers associated with it. The snubber 44 could equivalently have the shaft attached to the wall and the housing attached to the pipe. The shaft's other end slides within the bore of the housing, and the electromechanical means would lock and unlock this end of the shaft to and from the housing. The shaft and bore may have a round, square, hexagonal, or other cross section.

Figure 3:
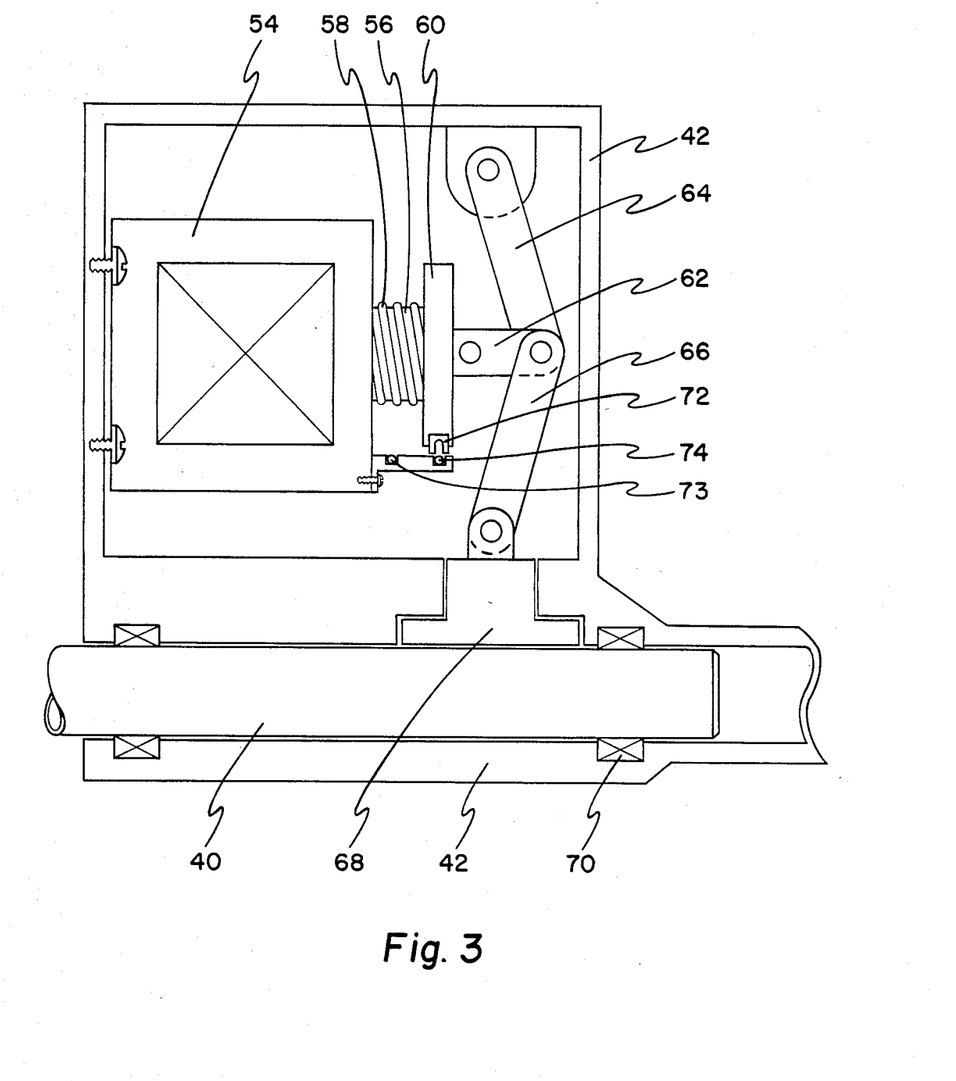
FIG. 3 is a cutaway view of the shaft-housing interacting portion of the brake-shoe type of electromechanical pipe snubber of FIG. 2.
Figure 4A:
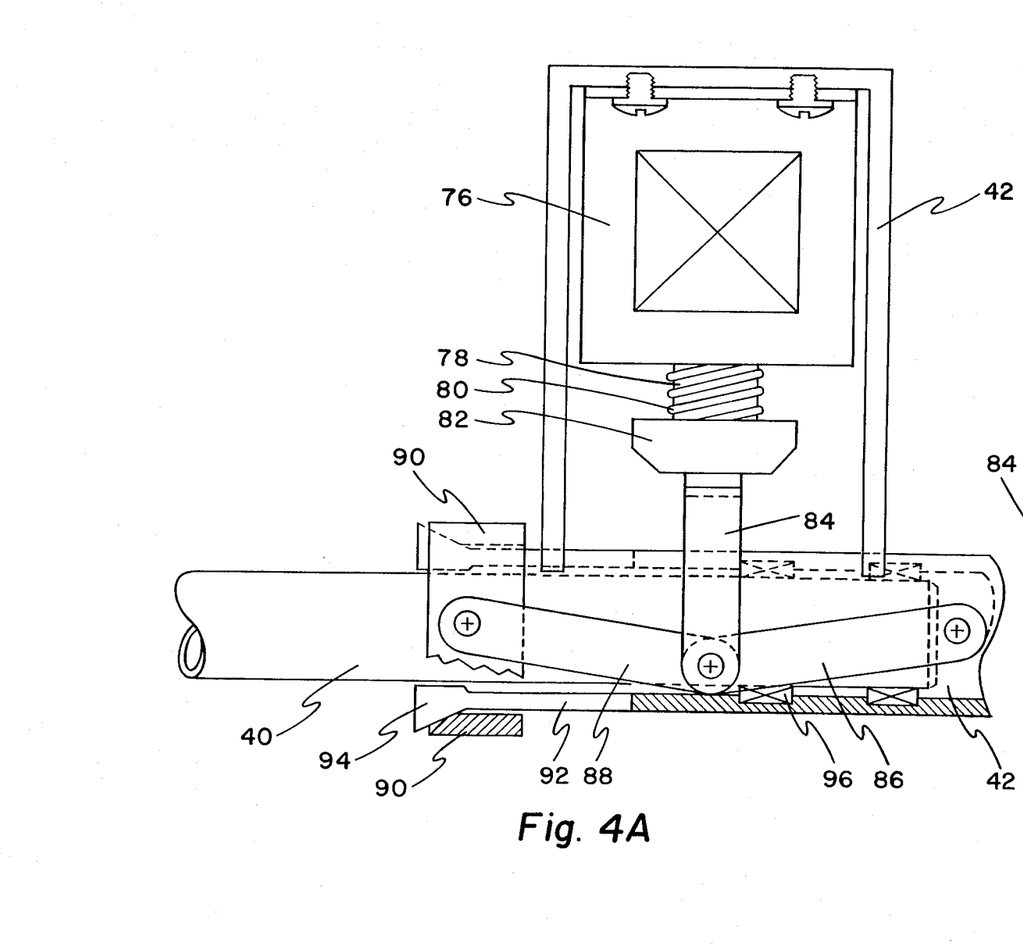
Figure 4B:
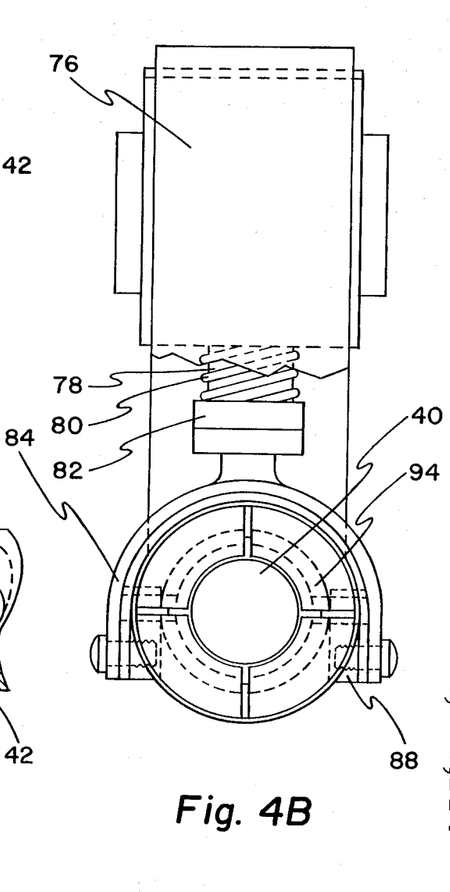
FIG. 4B is a cutaway left-end view, of the shaft-housing interacting portion of a collet-chuck type electromechanical pipe snubber.

Preferably, the electromechanical locking and unlocking means includes a solenoid accuated brake or friction shoe assembly, as shown in FIG. 3, which has a solenoid 54 with a spring 58 and a plunger 56, a brake shoe 68 and mechanical means for extending the brake shoe 68 with the plunger 56 to lock the shaft 40 against the bore and for retracting the brake shoe 68 to unlock the shaft 40. The solenoid 54 is attached to the snubber's housing 42. The wire leads 46 of FIG. 2 would be attached to the solenoid 54 of FIG. 3. The solenoid's plunger 56 has a cap 60 restraining the sring 58 which biases the plunger 56 to the extended posiion. Preferably, the mechanical means includes a plunger xtension 62 which moves the brake shoe 68 through a toggle joint arrangement to greatly increase the gripping force of the brake shoe 68 on the shaft 40. The grip may be increased further by having a rough finish (such as fine mating surface grooves) on the brake shoe and the shaft. The toggle joint has the plunger extension 62 hingeably attached to a first link 64 and a second link 66. The first link 64 has its other end hingeably attached to the housing 42, while the other end of the second link 66 is hingeably attached to the brake shoe 68. The brake shoe 68 slides within a housing recess to transversely engage the shaft 40 in the bore. The shaft 40 is held centered in the bore of the housing 42 by guide bushings 70. In operation, the closing of the power supply/snubber electrical circuit by the controller applies electric current to the solenoid 54 which draws in its plunger 56 causing the brake shoe 68, via the toggle joint, to grip the shaft 40. When the current is broken, the spring 58 extends the plunger 56 to retract the brake shoe 68, through the operation of the toggle joint, thereby unlocking the shaft 40.

In another perferred embodiment, the electromechanical locking and unlocking means includes a solenoid-actuated collet chuck assembly, as shown in FIGS. 4A and 4B, which has a solenoid 76 with a plunger 78, a collet chuck 92 attached to the housing 42, and mechanical means for accuating the collet chuck gripping jaws 94 with the plunger 78. The chuck jaw 94 coaxially surround the shaft in an annularly engagable array. The solenoid 76 has a cap 82 and a spring 80, as in the solenoid accuated brake shoe assembly of FIG. 3. Preferably, the mechanical means includes a plunger extension 84 which actuates the collet chuck jaws 94 through a toggle joint/collar arrangement. The toggle joint has the yoke shaped plunger extension 84 hingeably attached to a first link 86 and a second link 88. The first link 86 has its other end hingeably attached to the housing 42, while the other end of the second link 88 is hingeably attached to a collar 90. The collar 90 slides over the collet chuck 92, and is restrained by a taper on the jaws 94. Bushings 96 guide the longitudinal motion of the shaft 40 within the bore of the housing 42. In operation, electric current to the solenoid 76 draws in its plunger 78 causing the collar 90, via the toggle joint, to push against the taper of the collet chuck jaws 94 forcing the jaws 94 inward to annularly grip and lock the shaft 40. When the current to the solenoid is broken, the spring 80 will push the plunger 78 downward, the collar 90 will move back, and the resiliently biased collet chuck 92 will open its jaws 94 to unlock to shaft 40.

To either the basic or any of the augmented electromechanical pipe snubbing systems, there may be added means for indicating the lockup status of each of the pipe snubbers. Preferably, as shown in FIG. 3, such means would include a position indicator having a moving component 72 and a stationary component. The moving component 72 could typically be a magnet attached to the cap 60 of the solenoid's plunger 56. The stationary component would have a snubber locked indicating reed switch 73 and a snubber unlocked indicating reed switch 74. A reed switch is a standard commercial item, known to those skilled in the art, which can make an electrical connection in the presence of a magnetic field and break that electrical connection when the magnetic field is removed. A typical reed switch would consist of a sealed glass envelope containing two cantilever-supported, electrically conducting reeds. The free ends of the reeds overlap and have a gap between them. When a magnet is placed near the glass envelope area containing the free ends of the reeds, the reeds are attracted to each other and make electrical contact. When the magnet is removed, the reeds spring open, breaking the electrical contact. When the snubber is locked, the solenoid plunger 56 is retracted and the position indicator's moving component 72 would be carried into proximity with the "locked" indicating reed switch 73, closing an electrical circuit, not shown in FIG. 3, which leads to the snubber status indicator 32 of FIG. 1 to light up the "locked status" display bulb for the particular snubber. Likewise, when the snubber is unlocked, the solenoid plunger 56 is extended and the position indicator's moving component 72 would be carried into proximity with the "unlocked" indicating reed switch 74, closing a separate electric circuit (not shown in FIG. 3) which leads to the snubber status indicator 32 of FIG. 1 to light up the "unlocked status" display bulb for the particular snubber. Other lockup status indicating means would include contact-type switches, and could even include a pressure switch located on the brake shoe 68 to give a "locked" signal when the brake shoe 68 contacts the shaft 40. The snubber status indicator 32 of FIG. 1 is located in an environmentally safe area of the facility, away from radiation, etc.

The reliability of the pipe snubber portion of the pipe snubbing system may be checked by including means for making and breaking a separate electrical connection between the power supply 10 and each of the pipe snubbers' electromechanical locking and unlocking means. This will test the lockup operation of each of the pipe snubbers. Preferably, such means includes a test switch 12, as shown in FIG. 1. The test switch 12 could be a manual rotary switch having as many positions as there are pipe snubbers in a piping section, segment or even the whole facility. More than one test switch may be used. Position number 1 of the test switch 12 would electrically connect the power supply 10 with the electromechanical locking and unlocking means of snubber number 1. Position number 2 of the test switch 12 would connect with snubber number 2, etc. The test switch 12 would make and break the electrical connection to each snubber to cycle it through the locked and unlocked positions. The snubber status indicator 32 would display the locked or unlocked status of the snubbers as each was being tested. The snubber status indicator 32 could be a panel having lights for the locked and unlocked status of each snubber. Other testing means could include a simple single circuit closing switch bypassing the seismometer's first controller 14, of FIG. 1, which would test all the snubbers in unison.

The operation of the electromechanical pipe snubbing system depends on which particular system is chosen: seismometer, and/or thermometer, and/or vibrometer; on which operating philosophy is chosen: normally having the snubber unlocked vs. normally having them locked; on which locking philosophy is chosen: energizably locking versus de-energizably locking; and on which particular electromechanical snubber design is chosen: brake shoe, collet chuck, or some other type. The operation of a basic seismometer only, normally unlocked, energizably lockable, brake shoe type of system is as follows. The first controller 14 normally has the electrical connection open between the power supply 10 and the snubbers (e.g., snubber A 26, snubber B 28, and snubber C 30), and the snubber status indicator 32 displays the snubbers as "unlocked". When an earthquake occurs, the seismometer 16 ground movement data, which is being sent to the first controller 14, is interpreted to meet the earthquake initiation criterion, causing the first controller 14 to close the electrical connection between the power supply 10 and the snubbers. The closing of the connection causes a voltage to be applied to the wire leads 46 (see FIG. 2) leading to the snubber's solenoid 54 (see FIG. 3). This in turn retracts the solenoid plunger 56 which, through the toggle joint, forces the brake shoe 68 to lock the snubber's shaft 40. The retracted plunger's cap 60 carries the position indicator's moving component 72 into proximity with the position indicator's "locked" terminal 73 which makes an electrical connection with the "locked" status display bulb for that snubber on the snubber status indicator 32. When the earthquake is over, the seismometer 16 data to the first controller 14 is so interpreted, the electrical connection between the power supply 10 and the snubbers is opened, the spring 58 (see FIG. 3) moves the de-energized solenoid's plunger 56 to its extended position which withdraws the brake shoe 68, via the toggle joint. The extended plunger cap 60 now carries the position indicator's moving component 72 into proximity with the "unlocked" terminal 74 which lights up the "unlocked" status bulb on the snubber status indicator 32.

In summary, a pipe snubbing system may be created by having a control device switch an electrical connection between a power supply and an electromechanical locking and unlocking mechanism of each pipe snubber in a set, to lock each of the pipe snubbers when a sensor measurement indicates a snubber locking condition exists. The control device would switch back the connection when the sensor measurement indicates a snubber unlocking condition exists. Each pipe snubber would have a shaft with one end sliding within a bore in one end of a housing. The other end of the shaft and the other end of the housing would be rotatably attached, one to a pipe and the other to a support. The electromechanical locking and unlocking mechanism would lock and unlock the shaft's sliding end to and from the housing.

The foregoing description of a preferred embodiment of the invention has been presented for purposes of illustration and description. It is not intended to be exhaustive or to limit the invention in the precise form disclosed, and obviously many modifications and variarions are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A pipe support system comprising:
a plurality of snubbers for supporting a pipe system, each of said snubbers including means operable to lock the associated snubber in a position restraining pipe displacements and to unlock said associated snubber in a position permitting normal pipe displacements, each said snubber mounted between a pipe member and a structural support member and comprising a housing connected to one of said members and a shaft connected to the other of said members, said shaft mounted within said housing for relative reciprocal movemment thereto upon relative movement between said members, means for locking said shaft to said housing, said locking means comprising at least one gripping member mounted on said housing for movement relative thereto and engagable with said shaft to prevent movement between said housing and said shaft, and means on said housing connected to said gripping member for moving said gripping member into engagement with said shaft;
means for sensing an abnormal condition possibly effecting excessive pipe displacements; and
control means responsive to said sensing means for actuating said operable means to simultaneously lock all of said snubbers in unison and thereby restrain said pipe system against pipe displacements.

2. The system of claim 1, including means located remotely from said snubbers for visually displaying the locked and unlocked position of each of said snubbers.

3. The system of claim 1, wherein said control means includes separate means non-responsive to said sensing means for actuating said operable means to test the locking and unlocking performance of said snubbers.

4. The system of claim 1, wherein said sensing means comprises a seismometer responsive to earth movements.

5. The system of claim 1, wherein said sensing means comprises a temperature sensitive device responsive to temperature differentials.

6. The system of claim 1, wherein said sensing means comprises a vibrometer responsive to pipe oscillations.

7. The system of claim 1, wherein said sensing means includes a seismometer, a temperature sensitive device, and a vibrometer responsive to earth movements, temperature differentials and pipe oscillations, respectively, to actuate said operable means of all of said snubbers.

8. The pipe snubber of claim 1, wherein said operable means comprises a solenoid having a plunger, and means connecting said plunger to said gripping member.

9. The pipe snubber of claim 8, wherein said connecting means comprises a toggle linkage system amplifying the gripping force exerted by said gripping member on said shaft upon engagement therewith.

10. The pipe snubber of claim 9, wherein said gripping member comprises a brake shoe movable radially into and out of engagement with said shaft.

11. The pipe snubber of claim 9, wherein said gripping member comprises a plurality of jaws disposed radially about said shaft and a reciprocal collar connected to said toggle linkage and surrounding said jaws for urging said jaws radially into and out of engagement with said shaft.

* * * * *